(12) United States Patent
Muto et al.

(10) Patent No.: US 7,985,459 B2
(45) Date of Patent: Jul. 26, 2011

(54) FOAM FILLING MEMBER

(75) Inventors: Shinji Muto, Osaka (JP); Kazuhiko Kinpara, Osaka (JP); Takehiro Ui, Osaka (JP)

(73) Assignee: Nitto Denko Corporation, Osaka (JP)

( * ) Notice: Subject to any disclaimer, the term of this patent is extended or adjusted under 35 U.S.C. 154(b) by 30 days.

(21) Appl. No.: 12/382,922

(22) Filed: Mar. 26, 2009

(65) Prior Publication Data
US 2009/0193754 A1 Aug. 6, 2009

Related U.S. Application Data

(62) Division of application No. 11/119,747, filed on May 3, 2005, now Pat. No. 7,527,850.

(30) Foreign Application Priority Data

May 6, 2004 (JP) .................................. 2004-137647

(51) Int. Cl.
B32B 3/24 (2006.01)
(52) U.S. Cl. ...................................................... 428/136
(58) Field of Classification Search .................... 428/136
See application file for complete search history.

(56) References Cited

U.S. PATENT DOCUMENTS

| 5,642,914 | A | 7/1997 | Takabatake |
| 6,079,180 | A | 6/2000 | Wycech |
| 7,101,607 | B2 | 9/2006 | Mollendorf et al. |
| 2002/0148198 | A1 | 10/2002 | Wycech |

FOREIGN PATENT DOCUMENTS

| GB | 2287491 A | 9/1995 |
| JP | 51-154015 | 6/1950 |
| JP | H01-012976 | 1/1989 |
| JP | 8-282396 | 10/1996 |
| JP | 10-53157 | 2/1998 |
| JP | 10-323911 | 12/1998 |
| JP | 2003-63443 | 3/2003 |
| JP | 2003-094475 | 4/2003 |
| JP | 2003-146243 | 5/2003 |

*Primary Examiner* — William P Watkins, III
(74) *Attorney, Agent, or Firm* — Jean C. Edwards, Esq.; Edwards Neils PLLC

(57) ABSTRACT

A foam filling member having a foaming base material in sheet form which is simplified in structure so that it can be formed into a predetermined shape corresponding to a shape of a space of a structure with an improved working efficiency and can also be placed in a space of the structure with an improved working efficiency, without any need of the sticking to a wall surface of a partition wall defining the space of the structure. Incisions 4, 5, 6, 7, cut in partway along a thickness direction of the foaming base material 2 along a bending portion and cuts 9, 10 passing through in the thickness direction are formed in the foaming base material 2. By simply bending or folding the foaming base material 2 along the incisions 4, 5, 6, 7 and the cuts 9, 10, the foam filling member 1 can be formed in a three-dimensional shape corresponding to an interior space of a pillar and thus can be set in place in the interior space. By foaming the foaming base material 2 thus placed in the interior space, the foam can be filled up in the interior space, leaving no space therein.

2 Claims, 8 Drawing Sheets

FOAM FILLING MEMBER

CROSS-REFERENCE TO RELATED APPLICATIONS

The present invention is a divisional application of U.S. patent application Ser. No. 11/119,747, filed May. 3, 2005, now U.S. Pat. No. 7,527,850 which claims priority from Japanese Patent Application No. 2004-137647, filed May. 6, 2004, the disclosures of which are incorporated herein by reference.

BACKGROUND OF THE INVENTION

1. Field of the Invention

The present invention relates to a foam filling member used for filling a space of a structure with foam.

2. Description of the Prior Art

A foam filling member used for filling foaming material in a hollow structure, such as a pillar of a vehicle, is generally known.

For example JP Laid-open (Unexamined) Patent Publication No. 2003-146243 proposes a foam filling tool as an example of the foam filling member, which comprises a foaming base material formed of material which is foamed by heating from outside, a supporting member having a supporting plate for supporting one side of the foaming base material, the foaming base material being formed in generally annular form to correspond in size to the supporting plate, and an annular weir wall, projected from one side of the supporting plate, for supporting an inner circumferential wall of the foaming base material.

According to this foam filling tool, when the foaming base material is heated from outside after the foam filling tool is set in place in a hollow room such as a pillar of a vehicle, the foam filling of the foaming base material is suppressed with respect to a longitudinal direction of the hollow room by the supporting plate and is accelerated with respect to a direction substantially orthogonal to the longitudinal direction orienting toward the inner wall of the hollow room to produce the foam. Also, this foam filling of the foaming base material is prevented from progressing toward a center of an opening of the foaming base material by the annular weir wall of the supporting plate. This can allow the effective and smooth filling of the hollow room with the foam produced using a very small quantity of foaming base material to be foamed by heating.

Also, for example JP Laid-open (Unexamined) Patent Publication No. 2003-94475 proposes a gap filling material in sheet form as an example of the foam filling member having an expanding layer of material to be expanded by heating, one side of which grooves extending from one end to the other are formed, and the other side of which a sticking layer is formed.

This gap filling material has reduced thicknesses at portions thereof at which the grooves are formed, so that it is well curved around a curved surface of a pillar of a vehicle. Hence, even when the curved surface to which the gap filling material is stuck has a high curvature, the gap filling material can be stuck around it, leaving no space therebetween, so that when foamed and expanded by heating, it can be well filled in the gap leaving no space therebetween.

In the foam filling tool described by JP Laid-open (Unexamined) Patent Publication No. 2003-146243 cited above, the supporting plate is formed of hard, synthetic resin material so that when the foaming base material is foamed, the supporting plate can be prevented from being bent in a direction substantially orthogonal to a direction of its surface extending. by the pressure acting in the same direction or by its own weight, in order to prevent the foam filling of the foaming base material in a longitudinal direction of the hollow room, the drooping under its own weight in the longitudinal direction or the dropping of the same. This requires that the supporting plate be previously molded in a specified shape corresponding to a shape of cross section of the hollow room, thus requiring a variety of molds for various shapes of cross section of the hollow room.

On the other hand, the gap filling material described by JP Laid-open (Unexamined) Patent Publication No. 2003-94475 cited above is designed to stick the sticking layer on the curved surface of the pillar of the vehicle. Due to this, when the gap filling material is stuck on the curved surface and then is coated with an antirust paint and, thereafter, the expansion layer is expanded by heating from outside to fill the hollow room, there causes the problem that a region of the curved surface where the gap filling material was stuck is not coated with the antirust paint.

SUMMARY OF THE INVENTION

It is an object of the invention to provided a foam filling member having a foaming base material in sheet form, which is simplified in structure so that it can be formed into a predetermined shape corresponding to a shape of a structure with an improved working efficiency, and can also be placed in a space of the structure with an improved working efficiency, without needing to be stuck to a wall surface of a partition wall defining the space of the structure.

The present invention provides a novel foam filling member used for filling a space of structure by foaming it, the foam filling member comprising a foaming base material in a form of a sheet of foamable material in which incisions are cut in partway along a thickness direction of the foaming base material along a bending portion and/or cuts are formed passing through in the thickness direction of the foaming base material, wherein the foaming base material is formed in a predetermined shape by bending the foam filling base material along the incisions and/or the cuts.

According to the present foam filling member, the foam filling member can be formed in a predetermined shape corresponding to a space of a structure with improved working efficiency by simply bending or folding the foaming base material in sheet form along the incisions and/or the cuts. This eliminates the need of a mold having a cavity corresponding to the shape of the space of the structure, and as such reduces cost.

Also, the foam filling member is placed in the space of the structure in a state of the bent portions of the foaming base material and the outer edges of the foaming base material being in point-contact with or line-contact with the inside wall, which defines the interior space of the structure. This allows the foaming base material to be formed to correspond in shape to the space and be placed in the space without needing to be stuck on a wall of the space, thus producing an improved working efficiency. Also, since the foaming base material is not stuck on the wall of the space, the wall of the space can be subjected to required treatments even after the placement of the foam filling member.

In the foam filling member of the present invention, it is preferable that the foaming base material has a thickness of 0.5-6.0 mm and a flexural modulus of 20-150 MPa.

When the foaming base material is formed to have a thickness and a flexural modulus which fall within the respective specific ranges, the foaming base material has a resilience to shape, whereby the shape of the foaming base material can be reconfigured to its pre-bent shape. This resilience of the foaming base material brings the foam filling member placed in the space into press-contact with the wall of the space, to hold the foam filling member in a certain shape in the space of the structure. This causes the foam filling member to be reliably held in the space of the structure in the form corresponding to the space.

In the foam filling member of the present invention, it is preferable that the incisions and/or the cuts are formed along a longitudinal direction of the foaming base material.

This formation of the incisions and/or the cuts allows the foam filling member to be formed in a predetermined shape corresponding to cross-sectional shape of the space within the structure taken along a direction substantially orthogonal to a longitudinal direction of the space of the structure by bending or folding the foaming base material along the incisions and/or cuts in the direction orthogonal to the longitudinal direction.

In the foam filling member of the present invention, it is preferable that the incisions and/or the cuts are formed along a direction intersecting with a longitudinal direction of the foaming base material.

This formation of the incisions and/or the cuts can allow the foam filling member to be formed in a predetermined shape corresponding to the cross-sectional shape of the space of the structure taken along the longitudinal direction of the space of the structure by bending or folding the foaming base material along the incisions and/or cuts in the longitudinal direction.

In the foam filling member of the present invention, it is preferable that the foaming base material is provided with a retaining portion for retention to the structure.

The provision of the retaining portion for the foaming base material can allow the fixture of the foam filling member to the structure by retaining the retaining portion to the structure. This can allow the foam filling member to be fixed to the wall at the retaining portion only, and as such can ensure the fixture of the foam filling member to the structure, without negatively affecting subsequent treatments to the wall of the space.

In the foam filling member of the present invention, it is preferable that the foam filling member is used for foam filling in a first space and a second space of the structure comprising the first space, the second space adjoining to the first space, and a communication hole for communicating therebetween, wherein the foaming base material comprises an inserting portion, formed partway along a longitudinal direction thereof, to be inserted through the communication hole, a first space filling portion, formed on one lengthwise side thereof with respect to the inserting portion, to be placed in the first space, and a second space filling portion, formed on the other lengthwise side thereof with respect to the inserting portion, to be placed in the second space.

This formation can allow one of the first space filling portion and the second space filling portion to be placed in its corresponding first or second space and can allow the other space filling portion to be placed in the other space by inserting one of the first space filling portion and the second space filling portion of the foam filling member in the communication hole and passing the inserting portion through the communication hole. This can eliminate the need to place the space filling member in each of the first space and the second space, thus providing improved working efficiency. In addition, since both spaces can be filled with a single space filling member, cost reduction can be achieved.

Also, the present invention provides a foam filling member used for filling a space of a structure by foaming it, the foam filling member comprising a foaming base material in the form of a sheet of foamable material in which a cutout portion is formed passing through a thickness direction thereof, wherein the foaming base material is formed in a predetermined shape by inserting a foaming base material in the cutout portion.

According to the inventive foam filling member, the foaming base material is combined with an identical or different foaming base material by inserting the identical or different foaming base material into the cutout portion of the foaming base material in sheet form, whereby the foaming base material is formed in a predetermined shape corresponding to the shape of the space of the structure. This can provide a simple structure for allowing the foaming base material to be formed into a predetermined shape corresponding to the shape of the space of the structure with an improved working efficiency. This can eliminate the need for a mold having a cavity corresponding to the shape of the space of the structure and the like, and as such can allow cost reduction.

This can also allow the foaming base material to be placed in the space of the structure in a predetermined shape corresponding to the shape of the structure without any need to be stuck on a wall of the space, thus producing an improved working efficiency. Also, since the foaming base material is in the state of being not stuck on the wall of the space, the wall of the space can be subjected to required treatments even after the placement of the foam filling member.

DETAILED DESCRIPTION OF THE PREFERRED EMBODIMENTS

Figure 1:
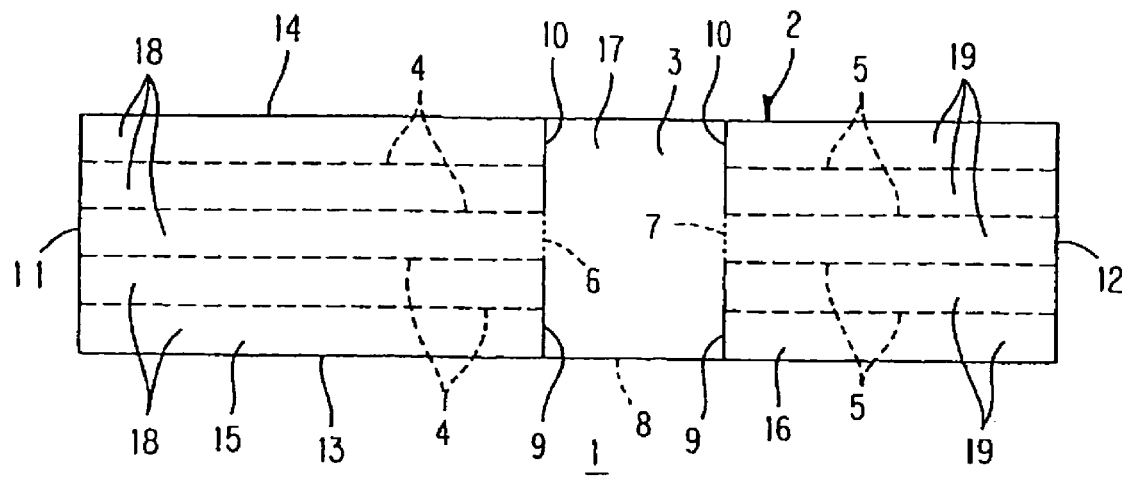
FIG. 1 is a plane view showing an embodiment (an elbow type) of a foam filling member of the present invention.
Figure 2:
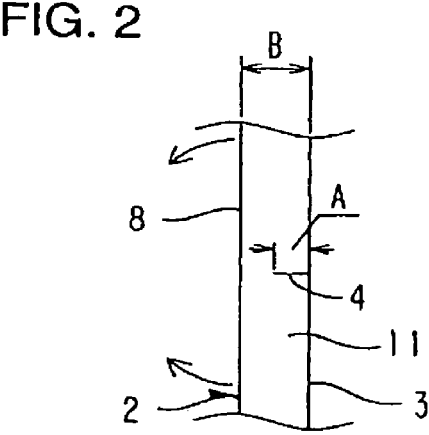
FIG. 2 is an enlarged side view of one lengthwise short side of the foam filling member shown in FIG. 1.
Figure 3:
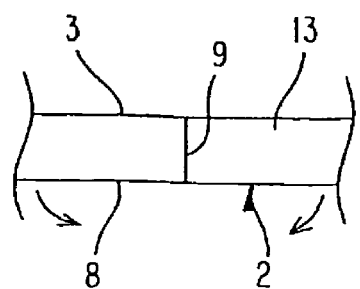
FIG. 3 is an enlarged side view of one widthwise long side of the foam filling member shown in FIG. 1.

FIG. 1 is a plane view showing an embodiment of a foam filling member of the present invention. FIG. 2 is an enlarged side view of one lengthwise short side of the foam filling member shown in FIG. 1. FIG. 3 is an enlarged side view of one widthwise long side of the foam filling member shown in FIG. 1.

Figure 5:
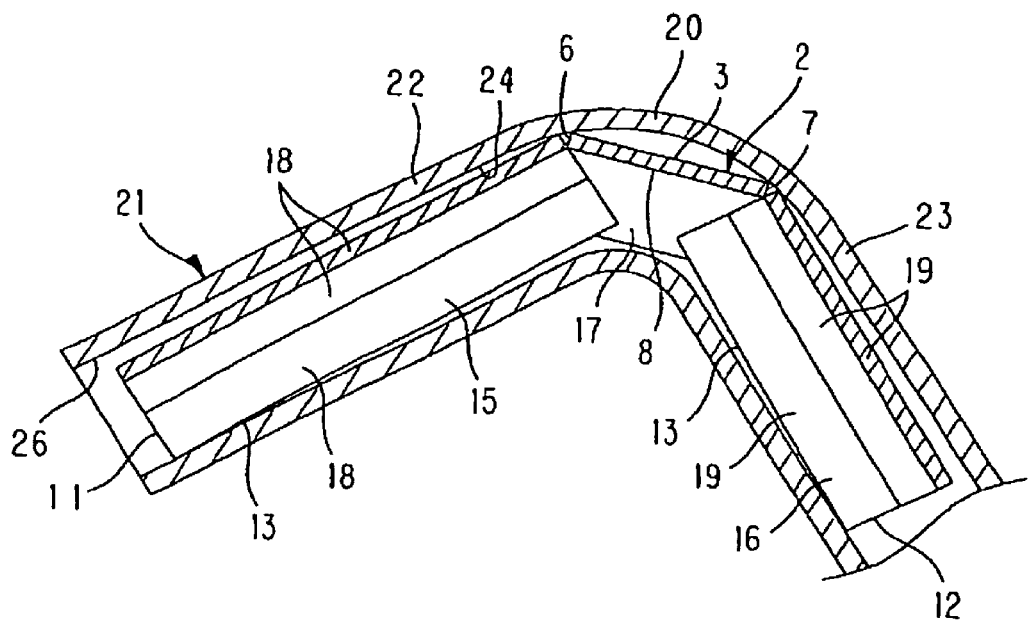
FIG. 5 is a sectional view showing the state of the foam filling member of FIG. 4 formed in three dimension being placed in an interior space of a pillar.

A foam filling member 1 shown in FIG. 1 is used for filling foaming material in an interior space 24, such as a pillar 21 of a vehicle as mentioned later and is formed by a single layer of foaming base material 2 in sheet form of foamable material (Cf. FIG. 5).

The foaming base material 2 is formed of foaming material which is foamed by heating (e.g. at about 120° C. to about 210° C.).

A known foamable polymer is used as the foamable material without any particular limitation. The foamable polymers that may be used include, for example, resins, such as ethylene•vinyl acetate copolymer, polyethylene, polypropylene, polyester, polyvinyl butyral, polyvinyl chloride, polyamide, and polyketone, and rubbers, such as styrene•butadiene rubber (SBR), and polybutadiene rubber (BR). Preferably, ethylene•vinyl acetate copolymer is used as the foamable material. The use of ethylene•vinyl acetate copolymer can provide an increased foam ratio. At least one or two materials of foamable polymer can be properly selected from these foamable polymers.

For enhancement of the foaming and curing of the foamable polymer, for example a cross-linking agent, a foaming agent, and, if necessary, a foam auxiliary agent, may be mixed further in the foamable material.

No particular limitation is imposed on the cross-linking agent, while for example a known radical forming agent that can be dissolved by heating to produce a free radical so as to form a cross-linking bond among molecules or in an individual molecule is used as the cross-linking agent. To be more specific, the radical forming agents that may be used include, for example, organic peroxides, such as dicumyl peroxide, 1,1-ditertiarybutylperoxy-3,3,5-trimethylcyclohexane, 2,5-dimethyl-2,5-ditertiarybutylperoxyhexane, 2,5-dimethyl-2,5-ditertiarybutylperoxyhexyne, 1,3-bis(tertiarybutylperoxyisopropyl)benzene, tertiarybutylperoxyketone, and tertiarybutylperoxybenzoate.

When the foamable polymer is to be vulcanized, a known vulcanizing agent can be used as the cross-linking agent. No particular limitation is imposed on such a vulcanizing agent. For example, sulfur, sulfur compounds, selenium, magnesium oxide, lead oxide, zinc oxide, polyamines, oximes, nitroso compounds, resins, and ammonium salts can be cited as the vulcanizing agent.

At least one or two materials of these cross-linking agents can be selectively used. No particular limitation is imposed on a mixing ratio of the cross-linking agent. For example, a mixing ratio of the cross-linking agent to the foamable polymer is in the range of 0.1-10 parts by weight, or preferably in the range of 0.5-7 parts by weight.

When the vulcanizing agent is used, a vulcanization accelerator may be used in combination. Known vulcanization accelerators including, for example, dithiocarbamine acids, thiazoles, guanidines, sulfenamides, thiurams, xanthogen acids, aldehyde ammonias, aldehyde amines, and thioureas, may be used. At least one or two materials of these vulcanization accelerators may be selectively used. A mixing ratio of the vulcanization accelerator to the foamable polymer is in the range of 0.1-5 parts by weight.

On the other hand, rather than the vulcanization accelerators, known vulcanization retardants such as, for example, organic acids and amines, may be properly selected for the mixture, for the purpose of molding control.

Also, no particular limitation is imposed on the foaming agent. For example, known inorganic or organic foaming agents are used. The inorganic foaming agents that may be used include, for example, ammonium carbonate, ammonium hydrogen carbonate, sodium hydrogen carbonate, ammonium nitrite, sodium borohydride, and azides.

The organic foaming agents that may be used include, for example, azo compounds, such as azodicarbonamide, barium azodicarboxylate, azobisisobutyronitrile, and azodicarboxylic amide, nitroso compounds, such as N,N'-dinitrosopentamethylenetetramine, N,N'-dimethyl-N,N'-dinitrosoterephthalamide, and trinitrotrimethyltriamine, hydrazide compounds, such as 4,4'-oxybis(benzenesulfonylhydrazide), paratoluene sulfonylhydrazide, diphenylsulfone-3,3'-disulfonylhydrazide, and allylbis(sulfonylhydrazide), semicarbazide compounds, such as p-toluilene sulfonylsemicarbazide, and 4,4'-oxybis(benzenesulfonylsemicarbazide), alkane fluorides, such as trichloromonofluoromethane, and dichloromonofluoromethane, and triazole compounds, such as 5-morpholyl-1,2,3,4-thiatriazole.

Among these foaming agents, the one that is dissolved at a temperature equal to or higher than a softening temperature of foamable polymer to generate gas and is hardly foamed in the process of forming the foaming base material 2 is selected properly in accordance to the composition thereof. The foaming agent that is foamed in a temperature range between about 120° C. and about 210° C. is preferably used.

At least one or two materials of these foaming agents can be selectively used. No particular limitation is imposed on a mixing ratio of the foaming agent. For example, a mixing ratio of the foaming agent to the foamable polymer is in the range of 5-50 parts by weight, or preferably in the range of 10-30 parts by weight, per 100 parts by weight of foamable polymer.

A quantity of foaming agent mixed is preferably in such a range that the foaming base material 2 containing the foaming agent, when foamed, practically generates a closed cell at about five to about twenty-five times, or preferably about ten to about twenty times, the foam ratio that the foaming base material containing no foaming agent does. When an excessively small quantity of foaming agent is mixed, the foaming base material 2 is not foamed sufficiently, while on the other hand, when an excessively large quantity of foaming agent is mixed, a resin drip of the foaming material obtained by the foaming is caused to thereby produce a void in the foamed resin, both causing filling loss.

No particular limitation is imposed on the foam auxiliary agent. For example, a known foam auxiliary agent may be selected properly in accordance to the type of foaming agent used. To be more specific, for example, urea compounds containing urea as a main component, metal oxides, such as zinc oxide, and lead oxide, higher fatty acids, such as salicylic acid, and stearic acid, or metal salts thereof can be cited as the foam auxiliary agent. A metal salt of a higher fatty acid is preferably used.

At least one or two materials of these foam auxiliary agents can be selectively used. No particular limitation is imposed on a mixing ratio of the foam auxiliary agent. For example, a mixing ratio of the foam auxiliary agent to the foamable polymer is in the range of 1-20 parts by weight, or preferably in the range of 5-10 parts by weight, per 100 parts by weight of foamable polymer.

Further, known additives including, for example, stabilizer, stiffener, filler, and softener and, if required, for example, plasticizer, age resister, antioxidant, pigment, colorant, fungicide, and flame retardant, may be additionally mixed properly for intended purposes and applications, within the range of having little influence on the physicality of the foam obtained.

The foaming base material 2 is integrally formed in a rectangular plate-like shape as viewed from top. It has incisions 4, 5, 6, 7 formed in a surface 3 on one side thereof, which are cut partway along a thickness direction thereof, as shown in FIG. 2, and also has cuts 9, 10 passing completely through to a surface 8 on the other side in the thickness direction, as shown in FIG. 3. In FIG. 1, in order to make discrimination between the incisions 4, 5, 6, 7 and the cuts 9, 10, the incisions 4, 5, 6, 7 are depicted in a broken line, and the cuts 9, 10 are depicted in a solid line, for descriptive purposes.

A plurality of incisions 4 (four incisions) are formed linearly in the surface 3 on one side of the foaming base material 2 to extend from one short side surface 11 on one longitudinal side thereof to the cuts 9, 10 on the one side formed partway along the longitudinal direction of the foaming base material 2 along the longitudinal direction of the foaming base material 2. These incisions 4 are arranged in parallel with each other at predetermined spaced intervals along a widthwise direction which is a direction orthogonal to the longitudinal direction of the foaming base material 2. These four incisions 4 are equally spaced along the widthwise direction of the foaming base material, to make five equal parts of the foaming base material 2.

The incisions 4 are cut partway along the thickness direction of the foaming base material 2 from the surface 3 on the one side toward the surface 8 on the other side, as shown in FIG. 2. A cut-in depth A is 0.1-0.9 times, or preferably 0.2-0.5 times, as long as a thickness B of the foaming base material 2.

Also, a cutting width is equal to a width of a cutter and is for example 300 µm or less, preferably in the range of 10-100 µm.

A plurality of incisions 5 (four incisions) are formed linearly in the surface 3 on one side of the foaming base material 2 to extend from the other short side surface 12 on the other longitudinal side thereof to the cuts 9, 10 on the other side formed partway along the longitudinal direction of the foaming base material 2 along the longitudinal direction of the foaming base material 2. These incisions 5 are arranged in parallel with each other at predetermined spaced intervals along the widthwise direction of the foaming base material 2. These four incisions 5 are equally spaced along the widthwise direction of the foaming base material 2, to take five equal parts of the foaming base material 2. The cut-in depth and cutting width of the incisions 5 are the same as those of the incisions 4.

A plurality of cuts (two cuts) 9 are formed linearly in the surface 3 on one side of the foaming base material 2 to extend from one long side surface 13 on one widthwise side thereof to the second incisions 4, 5 from the one long side surface 13 along the widthwise direction of the foaming base material 2. The cuts 9 are arranged in parallel with each other at predetermined spaced intervals, extending partway along the longitudinal direction of the foaming base material 2.

A plurality of cuts (two cuts) 10 are formed linearly in the surface 3 on one side of the foaming base material 2 to extend from the other long side surface 14 on one widthwise side thereof to the second incisions 4, 5 from the other long side surface 14 along the widthwise direction of the foaming base material 2. The cuts 10 are arranged in parallel with each other at predetermined spaced intervals, extending partway along the longitudinal direction of the foaming base material 2.

The respective cuts 9, 10 are arranged to confront each other across predetermined spaced intervals along the widthwise direction of the foaming base material 2 (the spaced intervals defined between the second cuts 4, 5 from the one long side surface 13 and the second cuts 4, 5 from the other long side surface 14).

The incisions 6, 7 are formed linearly along the widthwise direction to connect between the respective cuts 9, 10 arranged in lines to confront each other, respectively. The cut-in depth and cutting width of the incisions 6, 7 are the same as those of the incisions 4.

As a result of this formation of the incisions 4, 5, 6, 7 and the cuts 9, 10, a first linearly extending portion 15 extending along the longitudinal direction of the foaming base material 2 is defined by the one short side surface 11, the incision 6, and the cuttings 9, 10 formed at both widthwise sides of the incision 6; a second linearly extending portion 16 extending along the longitudinal direction of the foaming base material 2 is defined by the other short side surface 12, the incision 7, and the cuttings 9, 10 formed at both widthwise sides of the incision 7; and a first bending portion 17 is defined by the incision 6, the cuttings 9, 10 formed at both widthwise sides of the incision 6, the incision 7, and the cuttings 9, 10 formed at both widthwise sides of the incision 7. In the first linearly extending portion 15, a plurality of first bending strips 18 (five bending strips) defined by the one long side surface 13, the other long side surface 14, and the respective incisions 4 are arranged along the widthwise direction. In the second linearly extending portion 16, a plurality of second bending strips 19 (five bending strips) defined by the one long side surface 13, the other long side surface 14, and the respective incisions 5 are arranged along the widthwise direction.

The first linearly extending portion 15 and the first bending portion 17 are coupled to each other through the incision 6 so that they can be bent in the longitudinal direction of the foaming base material 2. The second linearly extending portion 16 and the first bending portion 17 are coupled to each other through the incision 7 so that they can be bent in the longitudinal direction of the foaming base material 2.

This can allow the foaming base material 2 to be bent along the cut-in direction of the incisions 4, 5 at the first linearly extending portion 15 and the second linearly extending portion 16 in the directions indicated by solid arrows of FIG. 2, so that the first bending strips 18 and the second bending strips 19, adjoining to each other in the widthwise direction of the foaming base material 2, can be bent at predetermined angles relative to each other.

This can also allow the foaming base material 2 to be bent along the incisions 6, 7 in the directions indicated by solid arrows of FIG. 3, with the one side surface 3 outward, and the other side surface 8 inward with respect to the bending direction, at the boundaries between the first linearly extending portion 15 and the first bending portion 17 and between the second linearly extending portion 16 and the first bending portion 17. As a result, the first linearly extending portion 15 and the first bending portion 17, and the second linearly extending portion 16 and the first bending portion 17, adjoining to each other in the longitudinal direction of the foaming base material 2, are bent at predetermined angles relative to each other.

The foaming base material 2 is produced in the following processes, for example. First, after the respective components cited above are mixed in the foaming material at a mixing ratio mentioned above, the mixture is kneaded using a mixing roll, a pressure kneader, and the like. Then, the resulting material is continuously formed in sheet form by the continuous molding using a press, a calender roll, or the like or by the extrusion using e.g. an extruder. Sequentially, the resulting sheet is stamped to form rectangular foaming base materials 2 and form the incisions 4, 5, 6, 7 and the cuts 9, 10 in the one side surfaces 3 of the respective foaming base materials 2. The foaming base materials 2 can be produced in the processes mentioned above.

The foaming base materials 2 thus formed each have a thickness in the range of 0.5-6.0 mm, or preferable 1.5-3.5 mm, and also have a flexural modulus of elasticity in the range of 20-150 MPa, or preferably 60-100 MPa. By setting the thickness and the flexural modulus of elasticity of the foaming base material 2 within those ranges, adequate degree of flexibility and repellent are given to the foaming base material 2.

Figure 4:
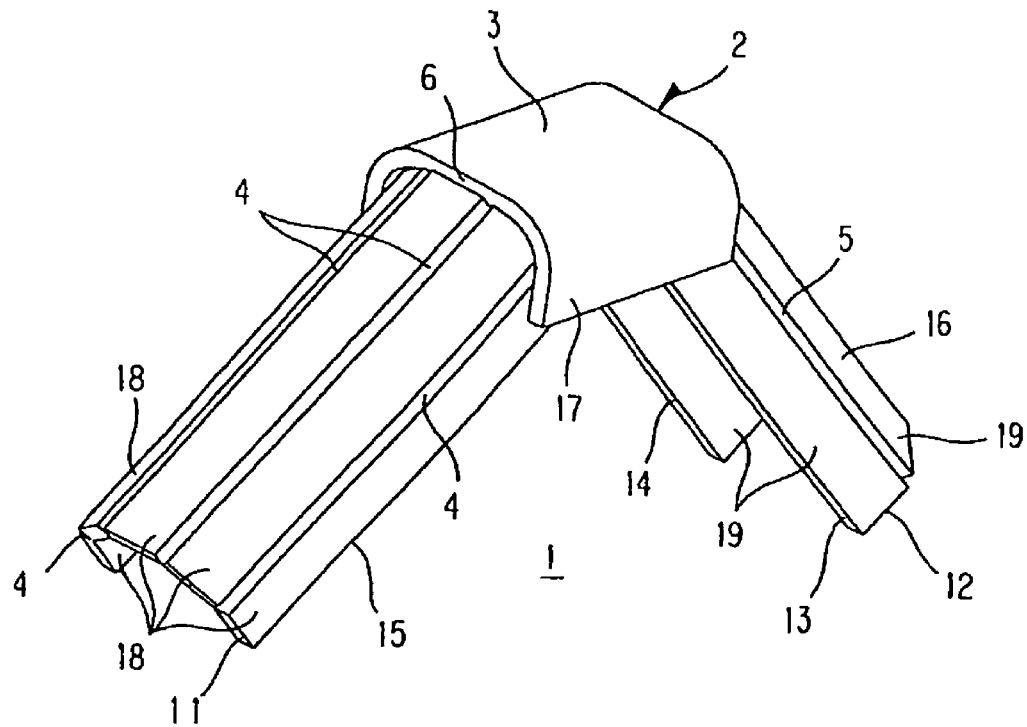
FIG. 4 is a perspective view showing the state of the foam filling member shown in FIG. 1 being bent along incisions and cuts to be formed in three dimensions.

The foaming base material 2 is bent along the incisions 4, 5, 6, 7 in a direction orthogonal to the cut-in direction of the incisions, with the one side surface 3 outward, and the other side surface 8 inward with respect to the bending direction. As a result, the foaming base material 2 is formed in a three-dimensional configuration corresponding to an elbow shape shown in FIG. 4.

Specifically, the five first bending strips 18 of the first linearly extending portion 15 are bent along the four incisions 4 connecting between the first bending strips 18 in the direction orthogonal to the cut-in direction of the incisions, with the one side surface 3 outward, and the other side surface 8 inward with respect to the bending direction. As a result, the foaming base material 2 is formed to have, at the first linearly extending portion 15, an inverted U-shaped section as viewed from the widthwise direction.

Also, the five second bending strips 19 of the second linearly extending portion 16 are bent along the four incisions 5 connecting between the second bending strips 19 in the direction orthogonal to the cut-in direction of the incisions, with the one side surface 3 outward, and the other side surface 8 inward with respect to the bending direction. As a result, the foaming base material 2 is formed to have, at the second linearly extending portion 16, an inverted U-shaped section as viewed from the widthwise direction.

In addition, the first linearly extending portion 15 and the first bending portion 17 are bent along the cut-in direction of the incision 6 connecting therebetween, to bend in the direction orthogonal to the cut-in direction, and the second linearly extending portion 16 and the first bending portion 17 are bent along the cut-in direction of the incision 7 connecting therebetween, to bend in the direction orthogonal to the cut-in direction. Further, the first bending portion 17 is curved to cover the one side surface 3 of the first and second linearly extending portions 15, 16 as bent in the inverted U-shape in section. As a result, the foaming base material 2 is formed in a generally inverted V-shape, when viewed from side elevation, with the one side surface 3 outward, and the other side surface 8 inward with respect to the bending direction.

The foam filling member 1 thus produced is disposed in a space defined between structures or in an interior space of a hollow structure and then is heated to a foaming temperature (e.g. about 120° C. to about 210° C.). Then, the foam filling member 1 is foamed and thereby the space is filled up, without leaving any space therein. Therefore, this foam filling member 1 can be used as foam filling members of a variety of industrial fields, including, for example, vibration-proof material, soundproof insulator, dust-proof material, heat-proof material, cushioning material, and water-proof material, for the purposes of damping, noise reduction, dust control, heat insulation, shock-absorbing, and water tight, without being limited to any particular ones.

To be more specific, when this foam filling member 1 is used for filling a hollow structure such as, for example, an interior space of a pillar of a vehicle by foaming, vibrations and noises of a vehicle engine or hissing sounds or fluttering sounds of the vehicle can be effectively prevented from being transmitted to the vehicle interior by the foam produced by foaming.

Next, a method of filling up the interior space of the pillar of the vehicle will be explained, taking an example of use of this foam filling member 1.

In this method, the foam filling member 1 formed to correspond in shape and size to a three-dimensional configuration of the interior space 24 of the pillar 21 to be filled is set in the pillar 21, first, as shown in FIG. 5.

The pillar 21 is formed in a generally inverted V-shape (an elbow shape) having a bend pipe portion 20 bent partway along the longitudinal direction and straight pipe portions 22, 23 formed integrally with the bend pipe portion 20 and extending straight from both lengthwise sides of the bend pipe portion 20. One straight pipe portion 22 has, at one end thereof opposite from the bend pipe portion 20, an opening 26 for receiving the foam filling member 1 therefrom.

When the foam filling member 1 is set in the interior of the pillar 21, the foaming base material 2 of the foam filling member 1 is introduced in the interior space 24 of the one straight pipe portion 22 from an end thereof on the side of the other short side surface 12 or on the free end side of the second linearly extending portion 16 of the foam filling member 1 through the opening 26 of the pillar 21, first. Then, it is inserted further until the second linearly extending portion 16 reaches a specified location in the interior space 24 of the other straight pipe portion 23, while it is bent along the bend pipe portion 20. As a result of this, the second linearly extending portion 16 is placed in the interior space 24 of the other straight pipe portion 23; the first bending portion 17 is placed in the interior space 24 of the bend pipe portion 20; and the first linearly extending portion 15 is placed in the interior space 24 of the one straight pipe portion 22, as shown in FIG. 5.

Thus, according to this foam filling member 1, the foaming base material 2 can be formed in a three-dimensional shape corresponding in shape and size to the interior space 24 of the pillar 21 formed in the elbow shape with improved working efficiency by a simple structure of simply bending the foaming base material 2 in sheet form along the incisions 4, 5, 6, 7 and the cuts 9, 10.

Specifically, the first linearly extending portion 15 and the second linearly extending portion 16 of the foaming base material 2 are formed in the inverted U-shape corresponding to radially sectioned shapes of the interior spaces 24 of the two straight pipe portions 22, 23 by simply bending those portions 15, 16 along the incisions 4, 5 formed along the longitudinal direction of the foaming base material 2 to extend in the widthwise direction of the foaming base material 2.

Also, the first linearly extending portion 15, the second linearly extending portion 16, and the first bending portion 17 are bent along the incisions 6, 7 and cuts 9, 10 formed along the widthwise direction of the foaming base material 2, respectively, in the longitudinal direction of the foaming base material 2. Further, the first bending portion 17 is curved to cover the one side surface 3 of the first and second linearly extending portions 15, 16 as bent in the inverted U-shape in section and thereby is formed in the inverted U-shape in section corresponding to the radially sectioned shape of the interior space 24 of the bend pipe portion 20.

By selecting the locations and the number of incisions 4, 5, 6, 7, and cuts 9, 10 to be formed in the foaming base material 2 or the angles of the respective strips of the foaming base material 2 to be bent along the incisions 4, 5, 6, 7, and cuts 9, 10 properly for producing the foam filling member 1, the foam filling member 1 can be formed in any three-dimensional shapes, such as, for example, the elbow shape as mentioned above, corresponding to various shapes of the pillar 21. This can eliminate the need of the mold having a cavity corresponding to the shape of the interior space 24 of the pillar 21, and the like, and as such can allow cost reduction.

Also, the foaming base material 2 of the foam filling member 1 is introduced in the interior space 24 of the one straight pipe portion 22 from an end thereof on the side of the other short side surface 12 through the opening 26 of the pillar 21, first, and, then, is inserted further until the second linearly extending portion 16 reaches a specified location in the interior space 24 of the other straight pipe portion 23, while it is bent along the bend pipe portion 20. As a result of this, the foaming base material 2 is placed in the interior space 24 of the pillar 21 in the state of its bent portions bent along the incisions 4, 5, 6, 7 and the cuts 9, 10 and outer edges of the foaming base material 2 being in point-contact with or line-contact with the inside wall defining the interior space 24 of the pillar 21.

Thus, since the foaming base material 2 can be configured to correspond to the shape of the interior space 24, it can be placed in the interior space 24 without any need to be stuck on the inside wall of the interior space 24, thus producing an improved working efficiency. Also, since the foaming base material 2 is in the state of being not stuck on the inside wall of the interior space 24, the inside wall can be subjected to a rust-proof treatment and the like, as mentioned later, even after the placement of the foam filling member 1.

In addition, since the foaming base material 2 of the foam filling member 1 is formed to have a thickness of 0.5-6.0 mm and a flexural modulus of elasticity of 20-150 MPa, a resilience (repellent) to force the foaming base material 2 as was placed in the interior space 24 in the bent state back into its original sheet form before bent is produced. This resilience of the foaming base material 2 brings the foam filling member 1 placed in the interior space 24 into press-contact with the inside wall of the interior space 24, to hold the foam filling member 1 in a certain shape in the interior space 24 of the pillar 21. This can produce the result that the foam filling member 1 in the interior space 24 of the pillar 21 can be reliably held in the form corresponding to the interior space 24.

Then, after the interior space 24 of the pillar 21 is subjected to required treatments, such as a rust-proof treatment, the foaming base material 2 of the foam filling member 1 is foamed and cured by heating (at a temperature of the order of 120-210° C.) in a subsequent process such as, for example, a drying line process at the baking finish, to thereby produce the foam, whereby the interior space 24 of the pillar 21 is filled up with the foam, leaving no space therein.

It is preferable that the foam has a density (weight (g) of foam/volume ($cm^3$) of foam) of e.g. 0.04-0.2 $g/cm^3$, or preferably 0.05-0.1 $g/cm^3$. Also, it is preferable that the foaming material is foamed at a foam ratio of five to twenty-five times, or preferably ten to twenty times, to obtain the foam.

Figure 6:
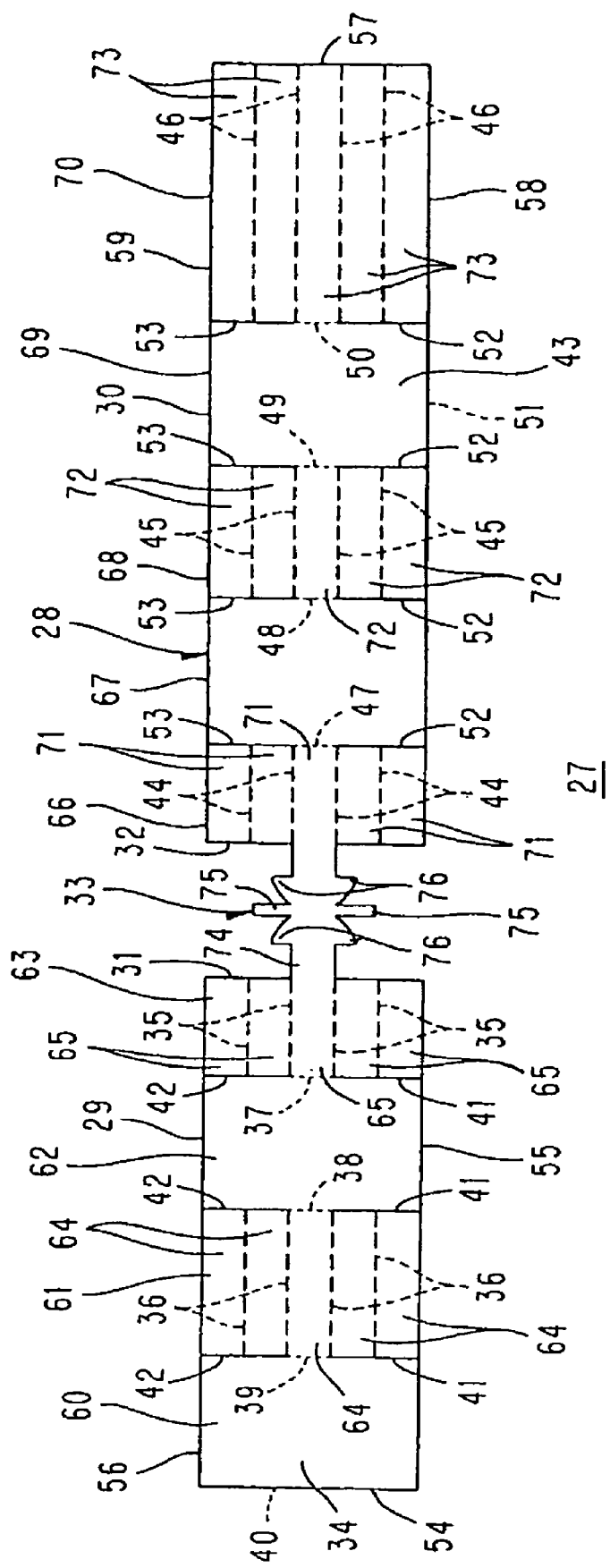
FIG. 6 is a plane view showing another embodiment (a ring-shaped type) of the foam filling member of the present invention.
Figure 7:
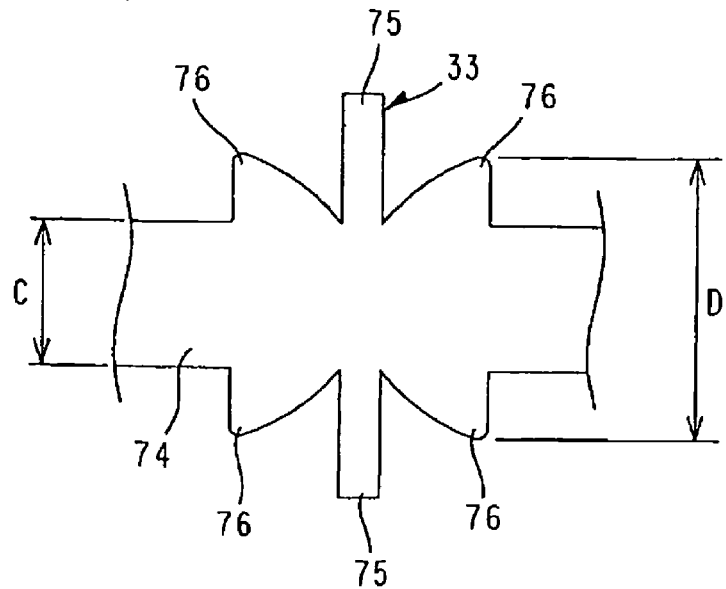
FIG. 7 is an enlarged plane view showing a retaining portion of the foam filling member of FIG. 6.

FIG. 6 is a plane view showing an another embodiment (a ring-shaped type) of the foam filling material of the present invention, and FIG. 7 is an enlarged plane view showing a retaining portion of the foam filing member of FIG. 6.

Figure 8:
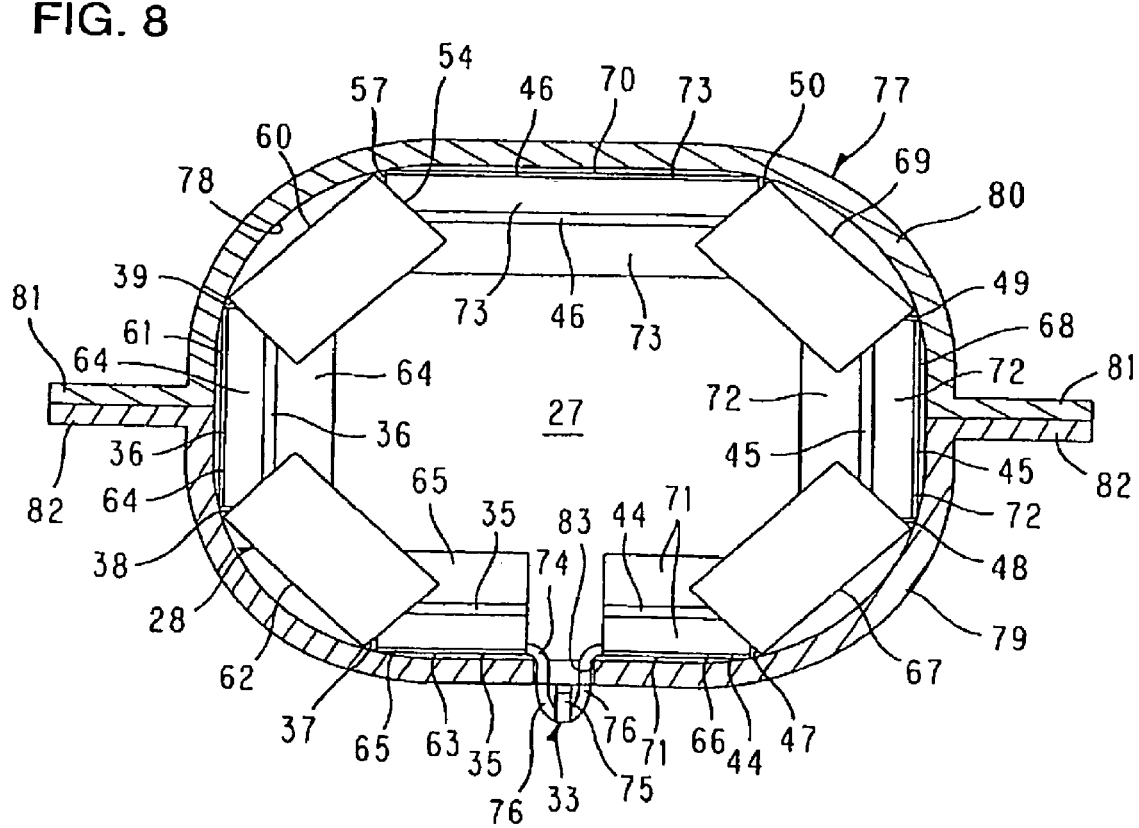
FIG. 8 is a sectional view showing the state of the foam filling member shown in FIG. 6 being bent along incisions and cuts to be formed in three dimension and placed in the interior space of the pillar.

A foam filling member 27 shown in FIG. 6 is used for filling foaming material in e.g. an interior space 78 of a pillar 77 of a vehicle as mentioned later and is formed by a single layer of foaming base material 28 in sheet form of foamable material (Cf. FIG. 8).

The foaming base material 28 is formed of foaming material which is foamed by heating (e.g. at about 120° C. to about 210° C.), as is the case with the above. The foaming base material 28 is formed in a rectangular plate-like shape as viewed from top, and comprises a first member 29, a second member 30, and a retaining portion 33 provided between the first member 29 and the second member 30. The first member 29, the second member 30, and the retaining portion 33 are arranged in the longitudinal direction of the foaming base material 28 at predetermined spaced intervals and formed in one piece. The first member 29 and the second member 30 are aligned with each other with respect to the longitudinal direction and are joined to each other via the retaining portion 33 so that one short side surface 31 of the first member 29 on one longitudinal side thereof and one short side surface 32 of the second member 30 on one longitudinal side thereof confront each other across a predetermined spaced interval.

The first member 29 has incisions 35, 36, 37, 38, 39 formed in a surface 34 on one side thereof which are cut in partway along a thickness direction thereof and cuts 41, 42 passing completely through to a surface 40 on the other side in the thickness direction. The second member 30 has incisions 44, 45, 46, 47, 48, 49, 50 formed in a surface 43 on one side thereof which are cut partway along a thickness direction thereof and cuts 52, 53 passing completely through to a surface 51 on the other side in the thickness direction.

In FIG. 6, in order to make discrimination between the incisions 35-39 and 44-50 and the cuts 41, 42, and 52, 53, the incisions 35-39 and 44-50 are depicted in a broken line, and the cuts 41, 42, and 52, 53 are depicted in a solid line, for descriptive purposes.

A plurality of incisions 35 (four incisions) are formed linearly in the surface 34 on one side of the first member 29 to extend from one short side surface 31 on one longitudinal side thereof along the longitudinal direction of the first member 29 to the first cuts 41, 42 from the one short side surface 31 which are formed partway along the longitudinal direction of the first member 29. These incisions 35 are arranged in parallel with each other at predetermined spaced intervals along a widthwise direction which is a direction orthogonal to the longitudinal direction of the first member 29. These four incisions 35 are equally spaced along the widthwise direction of the first member 29, to take five equal parts of the first member 29. The cut-in depth and width of the incisions 35 are the same as those of the incisions 4 mentioned above.

A plurality of incisions 36 (four incisions) are formed linearly in the surface 34 on one side of the first member 29 to extend from the second cuts 41, 42 from one short side surface 31 of the first member 29 which are formed in a substantially lengthwise center portion thereof to the third cuts 41, 42 from the one short side surface 31 which are formed on the other side partway along the longitudinal direction of the first member 29 along the longitudinal direction of the first member 29. These incisions 36 are arranged in parallel with each other at predetermined spaced intervals along the widthwise direction of the first member 29. These four incisions 36 are equally spaced along the widthwise direction of the first member 29, to take five equal parts of the first member 29. The cut-in depth and width of the incisions 36 are the same as those of the incisions 4 mentioned above.

A plurality of cuts (three cuts) 41 are formed linearly in the surface 34 on one side of the first member 29 to extend from one long side surface 55 on one widthwise side thereof to the second incisions 35, 36 from the one long side surface 55 along the widthwise direction of the first member 29. The cuts 41 are arranged in parallel with each other at predetermined spaced intervals in the longitudinal direction of the first member 29.

A plurality of cuts (three cuts) 42 are formed linearly in the surface 34 on one side of the first member 29 to extend from the other long side surface 56 on one widthwise side thereof to the second incisions 35, 36 from the other long side surface 56 along the widthwise direction of the first member 29. The cuts 42 are arranged in parallel with each other at predetermined spaced intervals, extending partway along the longitudinal direction of the first member 29.

The respective cuts 41, 42 are arranged to confront each other across predetermined spaced intervals along the widthwise direction of the first member 29 (the spaced intervals defined between the second incisions 35, 36 from the one long side surface 55 and the second incisions 35, 36 from the other long side surface 56).

The incisions 37, 38, 39 are formed linearly along the widthwise direction to connect between the respective cuts 41, 42 arranged in lines to confront each other, respectively. The cut-in depth and width of the incisions 37, 38, 39 are the same as those of the incisions 4.

As a result of this formation of the incisions 35, 36, 37, 38, 39 and the cuts 41, 42, a first bending portion 60 is defined by the other short side surface 54, the incision 39, and the cuts 41, 42 formed at both widthwise sides of the incision 39; a first linearly extending portion 61 is defined by the incision 39, the cuts 41, 42 formed at both widthwise sides of the incision 39, the incision 38, and the cuts 41, 42 formed at both widthwise sides of the incision 38; a second bending portion 62 is defined by the incision 38, the cuts 41, 42 formed at both widthwise sides of the incision 38, the incision 37, and the cuts 41, 42 formed at both widthwise sides of the incision 37; and a second linearly extending portion 63 is defined by the incision 37, the cuts 41, 42 formed at both widthwise sides of the incision 37, and the one short side surface 31. These first bending portion 60, the first linearly extending portion 61, the second bending portion 62, and the second linearly extending portion 63 are arranged in the longitudinal direction of the first member 29.

In the first linearly extending portion 61, a plurality of first bending strips 64 (five bending strips) defined by the one long side surface 55, the other long side surface 56, and the respective incisions 36 are arranged along the widthwise direction. In the second linearly extending portion 63, a plurality of second bending strips 65 (five bending strips) defined by the one long side surface 55, the other long side surface 56, and the respective incisions 35 are arranged along the widthwise direction.

The first bending portion 60 and the first linearly extending portion 61 are coupled to each other through the incision 39 so that they can be bent in the longitudinal direction of the first member 29. The first linearly extending portion 61 and the second bending portion 62 are coupled to each other through the incision 38 so that they can be bent in the longitudinal direction of the first member 29. Further, the second bending portion 62 and the second linearly extending portion 63 are coupled to each other through the incision 37 so that they can be bent in the longitudinal direction of the first member 29.

This can allow the first member 29 to be bent along the cut-in direction of the incisions 36, 35 at the first linearly extending portion 61 and the second linearly extending portion 63, so that the first bending strips 64 and the second bending strips 65, adjoining to each other in the widthwise direction of the first member 29, can be bent at predetermined angles relative to each other.

This can also allow the first member 29 to be bent along the cut-in directions of the incisions 39, 38, 37 at the boundaries between the first bending portion 60 and the first linearly extending portion 61, between the first linearly extending portion 61 and the second bending portion 62, and between the second bending portion 62 and the second linearly extending portion 63, so that the first bending portion 60 and the first linearly extending portion 61, the first linearly extending portion 61 and the second bending portion 62, and the second bending portion 62 and the second linearly extending portion 63, adjoining to each other in the longitudinal direction of the first member 29, are bent at predetermined angles relative to each other, respectively.

A plurality of incisions 44 (four incisions) are formed linearly in the surface 43 on one side of the second member 30 to extend from the one short side surface 32 along the longitudinal direction of the second member 30 to the first cuts 52, 53 from the one short side surface 31 which are formed partway along the longitudinal direction of the second member 30. These incisions 44 are arranged in parallel with each other at predetermined spaced intervals along a widthwise direction which is a direction orthogonal to the longitudinal direction of the second member 30. These four incisions 44 are equally spaced along the widthwise direction of the second member 30, to take five equal parts of the second member 30. The cut-in depth and width of the incisions 44 are the same as those of the incisions 4 mentioned above.

A plurality of incisions 45 (four incisions) are formed linearly in the surface 43 on one side of the second member 30 to extend from the second cuts 52, 53 from one short side surface 32 of the second member 30 which are formed partway along the longitudinal direction of the second member 30 to the third cuts 52, 53 from the one short side surface 32 which are formed on the other side partway along the longitudinal direction of the second member 30 along the longitudinal direction of the second member 30. These incisions 45 are arranged in parallel with each other at predetermined spaced intervals along the widthwise direction of the second member 30. These four incisions 45 are equally spaced along the widthwise direction of the second member 30, to take five equal parts of the second member 30. The cut-in depth and width of the incisions 45 are the same as those of the incisions 4 mentioned above.

A plurality of incisions 46 (four incisions) are formed linearly in the surface 43 on one side of the second member 30 to extend from the other short side surface 57 located on the other longitudinal side of the second member 30 to the forth cuts 52, 53 from the one short side surface 32 which are formed on the other side partway along the longitudinal direction of the second member 30 along the longitudinal direction of the second member 30. These incisions 46 are arranged in parallel with each other at predetermined spaced intervals along the widthwise direction of the second member 30. These four incisions 46 are equally spaced along the widthwise direction of the second member 30, to take five equal parts of the second member 30. The cut-in depth and width of the incisions 46 are the same as those of the incisions 4 mentioned above.

A plurality of cuts (four cuts) 52 are formed linearly in the surface 43 on one side of the second member 30 to extend from one long side surface 58 on one widthwise side thereof to the second incisions 44, 45, 46 from the one long side surface 58 along the widthwise direction of the second member 30. The cuts 52 are arranged in parallel with each other at predetermined spaced intervals in the longitudinal direction of the second member 30.

A plurality of cuts (four cuts) 53 are formed linearly in the surface 43 on one side of the second member 30 to extend from the other long side surface 59 on the other widthwise side thereof to the second incisions 44, 45, 46 from the other long side surface 59 along the widthwise direction of the second member 30. The cuts 53 are arranged in parallel with each other at predetermined spaced intervals along the longitudinal direction of the second member 30. The respective cuts 52, 53 are arranged to confront each other across predetermined spaced intervals along the widthwise direction of the second member 30 (the spaced intervals defined between the second incisions 44, 45, 46 from the one long side surface 58 and the second incisions 44, 45, 46 from the other long side surface 59).

The incisions 47, 48, 49, 50 are formed linearly along the widthwise direction to connect between the respective cuts 52, 53 arranged in lines to confront each other, respectively. The cut-in depth and width of the incisions 47, 48, 49, 50 are the same as those of the incisions 4.

As a result of this formation of the incisions 44, 45, 46, 47, 48, 49, 50 and the cuts 52, 53, a third linearly extending portion 66 is defined by the other short side surface 32, the incision 47, and the cuts 52, 53 formed at both widthwise sides of the incision 47; a third bending portion 67 is defined by the incision 47 and the cuts 52, 53 formed at both widthwise sides of the incision 47, the incision 48, and the cuts 52, 53 formed at both widthwise sides of the incision 48; a fourth linearly extending portion 68 is defined by the incision 48, the cuts 52, 53 formed at both widthwise sides of the incision 48, the incision 49, and the cuts 52, 53 formed at both widthwise sides of the incision 49; a fourth bending portion 69 is defined by the incision 49, the cuts 52, 53 formed at both widthwise sides of the incision 49, the incision 50, and the cuts 52, 53 formed at both widthwise sides of the incision 50, and a fifth linearly extending portion 70 is defined by the incision 50, the cuts 52, 53 formed at both widthwise sides of the incision 50, and the one short side surface 57. These third linearly extending portion 66, the third bending portion 67, the fourth linearly extending portion 68, the fourth bending portion 69, and the fifth linearly extending portion 70 are arranged in the longitudinal direction of the second member 30.

In the third linearly extending portion 66, a plurality of third bending strips 71 (five bending strips) defined by the one long side surface 58, the other long side surface 59, and the respective incisions 44 are arranged along the widthwise direction. In the fourth linearly extending portion 68, a plurality of fourth bending strips 72 (five bending strips) defined by the one long side surface 58, the other long side surface 59, and the respective incisions 45 are arranged along the widthwise direction. Further, in the fifth linearly extending portion 70, a plurality of fifth bending strips 73 (five bending strips) defined by the one long side surface 58, the other long side surface 59, and the respective incisions 46 are arranged along the widthwise direction.

The third linearly extending portion 66 and the third bending portion 67 are coupled to each other through the incision 47 so that they can be bent in the longitudinal direction of the second member 30. The third bending portion 67 and the fourth linearly extending portion 68 are coupled to each other through the incision 48 so that they can be bent in the longitudinal direction of the second member 30. The fourth linearly extending portion 68 and the fourth bending portion 69 are coupled to each other through the incision 49 so that they can be bent in the longitudinal direction of the second member 30. Further, the fourth bending portion 69 and the fifth linearly extending portion 70 are coupled to each other through the incision 50 so that they can be bent in the longitudinal direction of the second member 30.

This can allow the second member 30 to be bent along the cut-in direction of the incisions 44, 45, 46 at the third linearly extending portion 66, the fourth linearly extending portion 68, and the fifth linearly extending portion 70, so that the third bending strips 71, the fourth bending strips 72, and the fifth bending strips 73, adjoining to each other in the widthwise direction of the second member 30, can be bent at predetermined angles relative to each other.

This can also allow the second member 30 to be bent along the cut-in directions of the incisions 47, 48, 49, 50 at the boundaries between the third linearly extending portion 66 and the third bending portion 67, between the third bending portion 67 and the fourth linearly extending portion 68, between the fourth linearly extending portion 68 and the fourth bending portion 69, and between the fourth bending portion 69 and the fifth linearly extending portion 70, so that the third linearly extending portion 66 and the third bending portion 67, the third bending portion 67 and the fourth linearly extending portion 68, the fourth linearly extending portion 68 and the fourth bending portion 69, and the fourth bending portion 69 and the fifth linearly extending portion 70, adjoining to each other in the longitudinal direction of the second member 30, are bent at predetermined angles relative to each other, respectively.

The retaining portion 33 comprises a connecting portion 74 of a rectangular plate-like form, when viewed from top, for connecting between the second linearly extending portion 63 of the first member 29 and the third linearly extending portion 66 of the second member 30, a pair of retaining arms 75 projecting from a lengthwise center of the connecting portion 74 toward both widthwise sides thereof, and protruding portions 76 projecting from a lengthwise center of the connecting portion 74 toward both widthwise sides thereof. The connecting portion 74, the pair of retaining arms 75, and the protruding portions 76 are formed in one piece (Cf. FIG. 7)

The connecting portion 74 connects between a center portion of the one short side surface 31 of the first member 29 and a center portion of the one short side surface 32 of the second member 30. The connecting portion 74 has a width C formed to be equal to the widths of the second bending strips 65 and the third bending strips 71. It is formed to extend continuously with the second bending strip 65 located at the widthwise center of the second linearly extending portion 63 and the third bending strip 71 located at the widthwise center of the third linearly extending portion 66.

The retaining arms 75 are formed in a rectangular plate-like shape, as viewed from top, extending in a direction orthogonal to the longitudinal direction of the connecting portion 74.

The protruding portions 76 are formed in a generally triangular plate-like shape, obliquely extending at sides thereof extending continuously with the retaining arms 75. The connecting portion 74 is formed to have free ends extending beyond the top of the protruding portions 76 in the widthwise direction of the retaining arms 75.

The foaming base material 28 is continuously formed in sheet form in the same manner as in the above. Then, the resulting sheet is stamped so that it can be formed in a predetermined shape having the first member 29, the second member 30 and the retaining portion 33, and also the incisions 35-39 and the cuts 41, 42 can be formed in the surface 34 of the first member 29 on one side thereof and the incisions 44-50 and the cuts 52, 53 can be formed in the surface 43 of the second member 30 on one side thereof.

The foaming base material 28 thus produced is bent along the incisions 35-39, and 44-50 in the direction orthogonal to the cut-in direction of the incisions, with the one side surfaces 34, 43 outward, and the other side surfaces 40, 51 inward with respect to the bending direction. As a result, the foaming base material 28 is formed in a generally circular form shown in FIG. 8, as viewed from side elevation.

Specifically, the five first bending strips 64 of the first linearly extending portion 61 are bent along the four incisions 36 connecting between the first bending strips 64 in the direction orthogonal to the cut-in direction of the incisions, with the one side surface 34 outward, and the other side surface 40 inward with respect to the bending direction, to thereby form the foaming base material 28 having an inverted U-shaped section as viewed from the widthwise direction thereof.

The five second bending strips 65 of the second linearly extending portion 63 are bent along the four incisions 35 connecting between the second bending strips 65 in the direction orthogonal to the cut-in direction of the incisions, with the one side surface 34 outward, and the other side surface 40 inward with respect to the bending direction, to thereby form the foaming base material 28 having an inverted U-shaped section as viewed from the widthwise direction thereof, as in the case of the above.

The five third bending strips 71 of the third linearly extending portion 66 are bent along the four incisions 44 connecting between the third bending strips 71 in the direction orthogonal to the cut-in direction of the incisions, with the one side surface 43 outward, and the other side surface 51 inward with respect to the bending direction, to thereby form the foaming base material 28 having an inverted U-shaped section as viewed from the widthwise direction thereof, as in the case of the above.

The five fourth bending strips 72 of the fourth linearly extending portion 68 are bent along the four incisions 45 connecting between the fourth bending strips 72 in the direction orthogonal to the cut-in direction of the incisions, with the one side surface 43 outward, and the other side surface 51 inward with respect to the bending direction, to thereby form the foaming base material 28 having an inverted U-shaped section as viewed from the widthwise direction thereof, as in the case of the above.

The five fifth bending strips 73 of the fifth linearly extending portion 70 are bent along the four incisions 46 connecting between the fifth bending strips 73 in the direction orthogonal to the cut-in direction of the incisions, with the one side surface 43 outward, and the other side surface 51 inward with respect to the bending direction, to thereby form the foaming base material 28 having an inverted U-shaped section as viewed from the widthwise direction thereof.

Also, the respective bending portions and the respective linearly extending portions are bend along their respective incisions 37-39 and 47-50 connecting therebetween, in the direction orthogonal to the cut-in directions of the incisions. In addition, the first bending portion 60 and the second bending portion 62, and the third bending portion 67 and the fourth bending portion 69 are curved to cover the one side surface 34 of the first linearly extending portion 61 and the second linearly extending portion 63, and the one side surface 43 of the third linearly extending portion 66, the fourth linearly extending portion 68, and the fifth linearly extending portion 70, as were bend in the inverted U-shape in section, respectively. As a result, the foam filling member 28 is formed in an annular form, as viewed from side elevation, with the one side surfaces 34, 43 outward, and the other side surfaces 40, 51 inward with respect to the bending direction.

Figure 9:
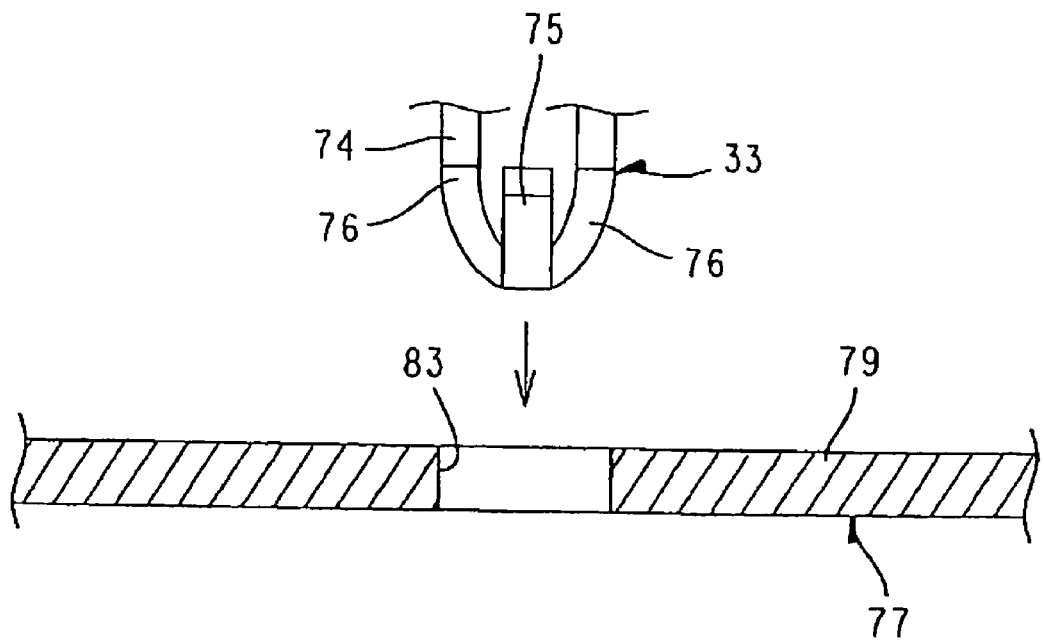
FIG. 9 is a longitudinal sectional view showing the state of the retaining portion of the foam filling member of FIG. 6 being inserted in a retaining hole of the pillar.
Figure 10:
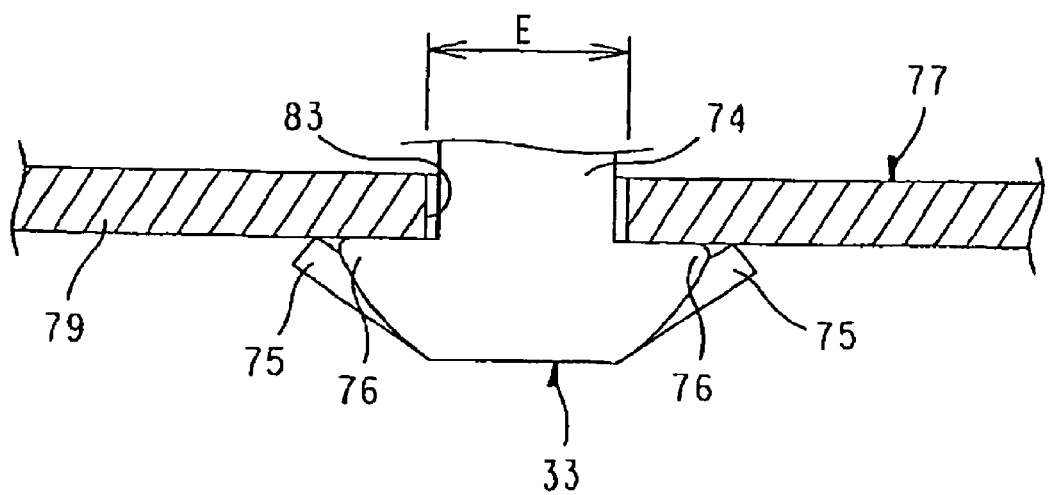
FIG. 10 is a cross-sectional view showing the state of the insertion of the retaining portion being completed from the state shown in FIG. 9.

Further, the retaining portion 33 is folded in two in the same direction at a lengthwise center of the connecting portion 74 and also base portions of the connecting portion 74 are bent outwardly of the annulus, as shown in FIGS. 8 and 9, and, further, the retaining arms 75 are bent inwardly of the annulus to project outwardly of the annulus, as shown in FIG. 10.

Then, after the foam filling member 27 thus produced is placed in the space of the structure or the interior space of the hollow structure, it is heated to a foaming temperature. Then, the foam filling member 27 is foamed to fill up the space of the structure, leaving no space therein. Accordingly, this foam filling member 27 can be applied as various industrial products.

Next, a method of filling up the interior space of the pillar of the vehicle will be explained, taking an example of use of this foam filling member 27.

In this method, the foam filling member 27 formed to correspond in shape and size to a three-dimensional configuration of the interior space 78 of the pillar 77 to be filled is set in the pillar 77, first, as shown in FIG. 8.

The pillar 77 comprises an inner panel 79 and an outer panel 80. Each of the inner panel 79 and the outer panel 80 has a concave shape of cross section having an opening at one side thereof and has a flange 81, 82, formed at both ends, to extend along an opening width of the opening. The inner panel 79 and the outer panel 80 are welded together, with their flanges 81, 82 abutted with each other, whereby the pillar 77 is formed to define the interior space 78 as a closed section.

When the foam filling member 27 is placed in the interior of the pillar 77, the inner panel 79 and the outer panel 80 of the pillar 77 are in the state of being separated from each other. Then, the foam filling member 27 is bent along the respective incisions 35-39, and 44-50 in the direction orthogonal to the cut-in direction of the incisions, with the one side surface 34, 43 outward and the other side surface 40, 51 inward with respect to the bending direction, so that it is formed in a generally annular shape corresponding to the shape of cross section of the pillar 77, when viewed from side elevation. Then, the retaining portion 33 is retained in a retaining hole 83 previously formed in the inner panel 79.

Specifically, the retaining arms 75 and protruding portions 76 of the retaining portion 33 are inserted through the retaining hole 83 as indicated by a solid arrow of FIG. 9. The retaining hole 83 is formed so that a width E (FIG. 10) of the pillar 77 extending along a longitudinal direction thereof is larger than a width C of the connecting portion 74 and also smaller than a width D (FIG. 7) between apexes of the protruding portions 76 protruding from both sides of the connecting portion 74. This configuration can allow the passage of the retaining arms 75 and the protruding portions 76 through the retaining hole 83, while being elastically deformed inwardly in the widthwise direction and, after the passage through the retaining hole 83, allows the resilient deformation of the same outwardly in the widthwise direction to put the free ends of the retaining arms 75 and the end portions of the protruding portions 76 into abutment with an outside surface of the inner panel 79, as shown in FIG. 10. As a result, the foam filling member 27 is fixed to the inner panel 79.

Thereafter, the flanges 81, 82 of the inner panel 79 and the outer panel 80 are abutted with each other and then welded together, so that the foam filling member 27 is set in place in the pillar 77.

This pillar 77 is used specifically as a front pillar, a side pillar, or a rear pillar of a vehicle body.

Then, after the pillar 77 is subjected to required treatments, such as a rust-proof treatment, the foaming base material 28 of the foam filling member 27 is foamed and cured by heating in a subsequent process such as, for example, a drying line process at the baking finish, to thereby produce the foam, whereby the interior space 78 of the pillar 77 is filled up with the foam, leaving no space therein. It is preferable that the foam obtained has substantially the same density and foam ratio as those of the above.

In the foam filling member 27, the foam filling member 27 can be fixed to the pillar 77 by retaining the retaining portion 33 in the retaining hole 83 of the pillar 77. This can allow the foam filling member 27 to be fixed to the inside surface defining the interior space 28 at the retaining portion 33 only, and as such can ensure the fixture of the foam filling member 27 to the pillar 77, without negatively affecting subsequent treatments to the wall of the interior space, such as the rust-proof treatment.

Figure 11:
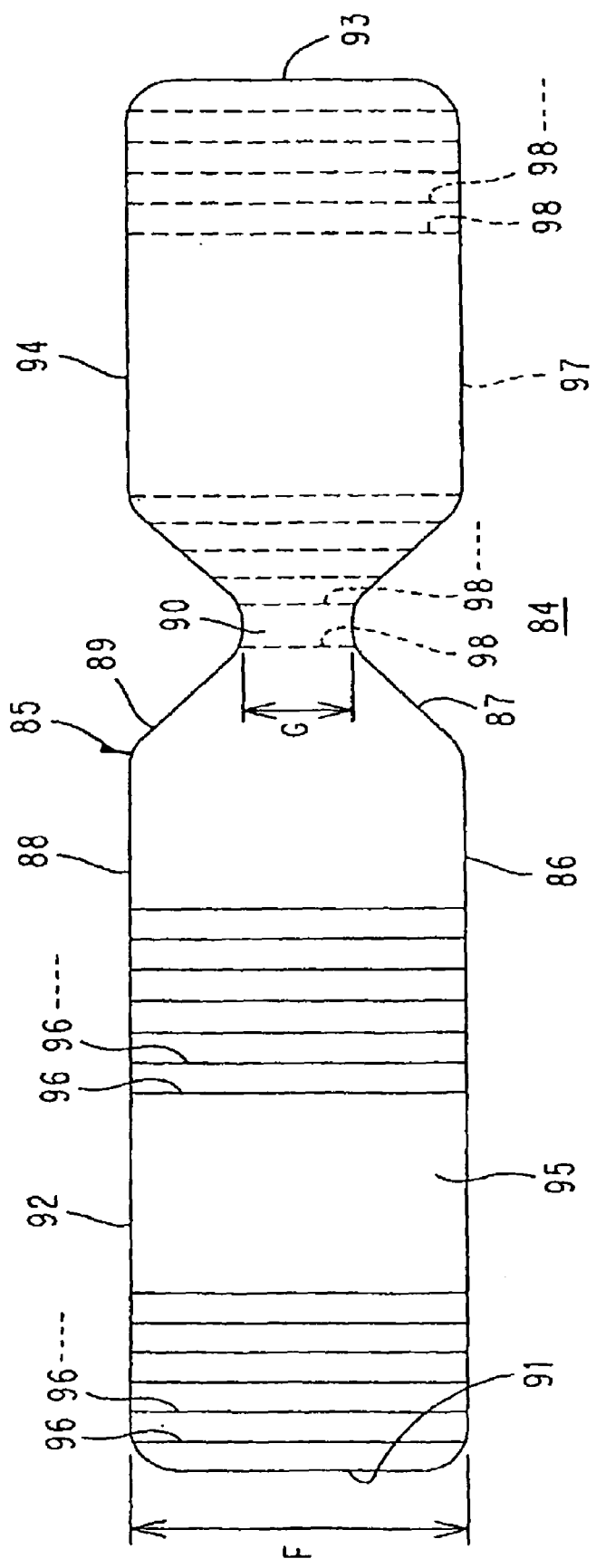
FIG. 11 is a plane view showing still another embodiment (a figure-eight shape as viewed from side elevation) of the foam filling member of the present invention.

FIG. 11 is a plane view showing still another embodiment of the foam filling member of the present invention.

Figure 12:
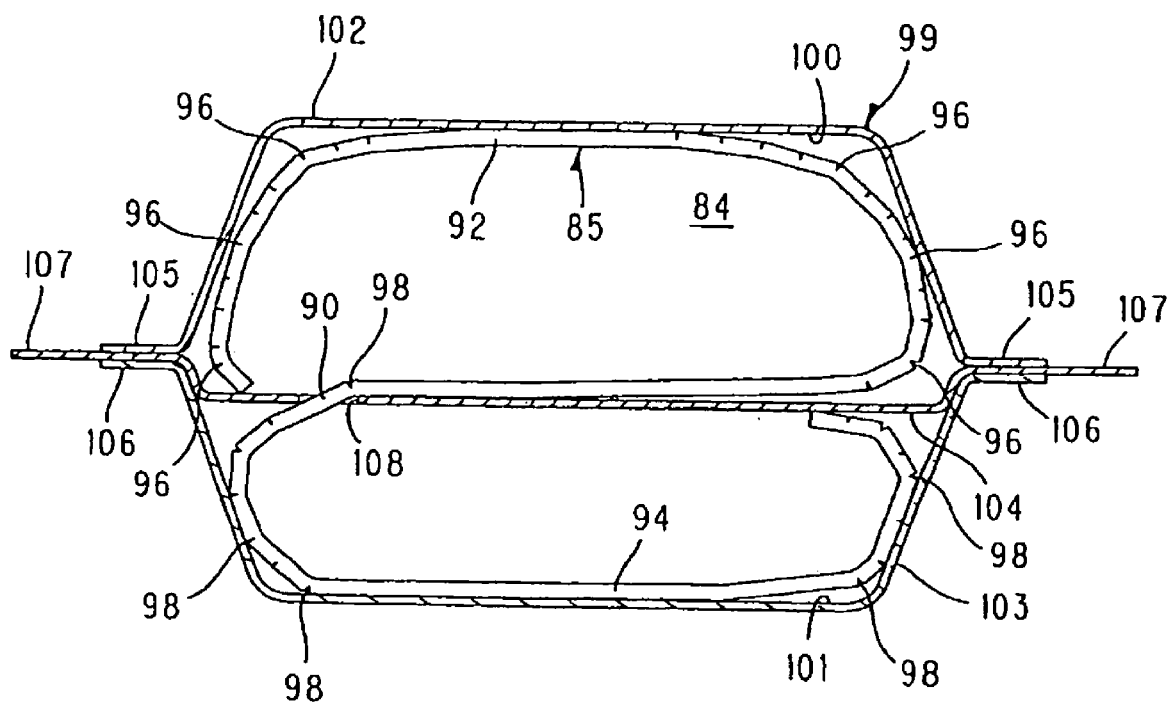
FIG. 12 is a sectional view showing the state of the foam filling member of FIG. 11 being bent along incisions to be formed in three dimension and placed in the interior space of the pillar.

A foam filling member 84 shown in FIG. 11 is used for filling foaming material in a first space 100 and a second space 101 of a pillar 99 of a vehicle comprising the adjoining first and second spaces 100 and 101 mentioned later and is formed by a single layer of foaming base material 85 in sheet form of foamable material (Cf. FIG. 12).

The foaming base material 85 is formed of foaming material which is foamed by heating (e.g. at about 120° C. to about 210° C.) as in the case of above. The foaming base material 85 is formed in a rectangular shape, as viewed from top, comprising an inserting portion 90 formed partway along a longitudinal direction thereof, a first space filling portion 92 formed at one lengthwise side thereof with respect to the inserting portion 90, and a second space filling portion 94 formed at the other lengthwise side thereof with respect to the inserting portion 90. The respective portions 90, 92, and 94 are formed in one piece.

Specifically, the foaming base material 85 has a generally V-shaped recess 87, as viewed from top, which is formed partway along the lengthwise dimension of its one long side surface 86 on the widthwise one side of the foaming base material 85, to be recessed inwardly in a widthwise direction which is a direction orthogonal to the longitudinal direction. It also has a generally V-shaped recess 89, as viewed from top, which is formed partway along the lengthwise dimension of the other long side surface 88 on the widthwise opposite side of the foaming base material 85, to be recessed inwardly in the widthwise direction. The recess 87 and the recess 89 are formed at locations confronting each other with respect to the widthwise direction of the foaming base material 85.

Thus, the foaming base material 85 has the narrowest portion in a generally rectangular shape in the form of the inserting portion 90 which is defined by the recesses 87, 89 formed to confront each other in the widthwise direction of the foaming base material 85 at locations in the longitudinal direction of the foaming base material 85. It also has, at both sides of the inserting portion 90, the first space filling portion 92 which is defined by a generally rectangular portion of the foaming base material extending from one lateral side thereof to one short side surface 91, and the second space filling portion 94 which is defined by a generally rectangular portion of the foaming base material extending from the other lateral side thereof to the other short side surface 93.

The first space filling portion 92 and the second space filling portion 94 are formed to have the same width F, and the inserting portion 90 is formed to have a width G narrower than the width F.

The foaming base material 85 has incisions 96 formed in a surface 95 on one side thereof which are cut partway along a thickness direction thereof and also has incisions 98 formed in a surface 97 on the other side thereof which are cut partway along the thickness direction thereof. In FIG. 11, in order to make discrimination between the incisions 96 formed in the surface 95 on the one side and the incisions 98 formed in the surface 97 on the other side opposite to the one side, the incisions 96 are depicted in a solid line, and the incisions 98 are depicted in a broken line, for descriptive purposes.

The incisions 96 are formed in an area of the one side surface 95 of the foaming base material 85 located near the one short side surface 91 on one lengthwise side of the first space filling portion 92 and in a substantially lengthwise center area of the same, two or more for each area, extending linearly along the widthwise direction of the foaming base material 85.

The incisions 98 are formed in an area of the other side surface 93 of the foaming base material 85 located near the other short side surface 96 on the other lengthwise side of the second space filling portion 94 and in an area located near the inserting portion 90 including the inserting portion 90, two or more for each area, extending linearly along the widthwise direction of the foaming base material 85.

Although the example wherein six incisions 96 and seven incisions 96 are formed in the area near the one short side surface 95 and in the substantially lengthwise center area, respectively, and five incisions 94 and six incisions 94 are formed in the area near the other short side surface 98 and in the area near the inserting portion 90, respectively, has been illustrated in FIG. 11, the real number of incisions are not limited thereto.

The foaming base material 85 is continuously formed in sheet form in the same manner as in the above. Then, the resulting sheet is stamped so that it can be formed in the generally rectangular shape having the first space filling portion 92, the inserting portion 90, and the second space filling portion 94, and also the incisions 96 can be formed in the surface 91 on one side thereof and the incisions 98 can be formed in the surface 93 on the other side thereof.

The foaming base material 85 thus produced is bent along the incisions 96 in the direction orthogonal to the cut-in direction of the incisions, with the one side surface 91 outward, and the other side surface 93 inward with respect to the bending direction and also is bent along the incisions 98 in the direction orthogonal to the cut-in direction of the incisions, with the other side surface 93 outward, and the one side surface 91 inward with respect to the bending direction. As a result, the foaming base material 85 is formed in a generally figure-eight shape as viewed from side elevation as shown in FIG. 12.

The foam filling member 84 thus produced is placed in a space between structures or in an interior space of a hollow structure and then is heated to a foaming temperature. Then, the foam filling member 84 is foamed and thereby the space is filled up, without leaving any space therein. Therefore, this foam filling member 84 can be used as foam filling members of a variety of industrial products.

Next, a method of filling up adjoining the first and second spaces of the pillar of the vehicle will be explained, taking an example of use of this foam filling member 84.

In this method, the foam filling member 84 formed to correspond in shape and size to a three-dimensional configuration of the adjoining the first space 100 and the second space 101 of the pillar 99 to be filled is set in the pillar 99, first, as shown in FIG. 12.

The pillar 99 comprises an inner panel 102, an outer panel 103 and a center panel 104. Each of the inner panel 102 and the outer panel 103 has a generally concave shape of cross section having an opening at one side thereof and has a flange 105, 106, formed at both ends, to extend along an opening width of the opening. The center panel 104 has a generally concave shape of cross section to be fitted in the opening of the outer panel 103 and having a flange 107 formed at both ends, to extend along the opening width of the opening. It has a communicating hole 108, formed in a recessed portion thereof, to extend through in the thickness direction. The communicating hole 108 has a width extending along the longitudinal direction of the pillar 99, the width being lager than the width G of the communicating portion 90 but smaller than the width F of the first and second space filling portions 92 and 94.

The pillar 99 is formed so that the inner panel 102, the center panel 104, and the outer panel 103 are welded together with their flanges 105, 106, and 107 abutted with each other in the state of the center panel 104 being sandwiched between the inner panel 102 and the outer panel 103 and thereby the first space 100 is defined as the closed section between the inner panel 102 and the center panel 104, and the second space 101 is defined as the closed section between the outer panel 103 and the center panel 104.

When the foam filling member 84 is placed in the interior of the pillar 99, the inner panel 102, the center panel 104, and the outer panel 103 of the pillar 99 are in the state of being separated from each other. In this state, the second space filling portion 94 of the foam filling member 84 is inserted in the communicating hole 108 of the center panel 104, while being bent the second space filling portion 94 of the foam filling member 84 in the widthwise direction and, then, the inserting portion 90 is inserted in and passes through the communicating hole 108.

Thereafter, in the state of the first space filling portion 92 of the foam filling member 84 being bent along the incisions 96 so that it can extend along the shape of the cross-section of the inside surface of the inner panel 102 (the first space 100) to be bent along the longitudinal direction thereof and also the second space filling portion 94 of the foam filling member 84 being bent along the incisions 98 so that it can extend along the shape of the cross-section of the inside surface of the outer panel 103 (the second space 101) to be bent along the longitudinal direction thereof, the inner panel 102, the outer panel 103, and the center panel 104 are welded together with their flanges 105, 106, and 107 abutted with each other. The foam filling member 84 is placed in the interior of the pillar 99 in this manner. This pillar 99 is used specifically as the front pillar, the side pillar, or the rear pillar of a vehicle body.

Then, after the pillar 99 is subjected to required treatments, such as the rust-proof treatment, the foaming base material 85 of the foam filling member 84 is foamed and cured by heating in the subsequent process such as, for example, the drying line process at the baking finish, to thereby produce the foam, whereby the first space 100 and the second space 101 of the pillar 99 are filled up with the foam, leaving no space therein. It is preferable that the foam obtained has substantially the same density and foam ratio as those of the above.

The foam filling member 84 thus configured can allow the placement of the first space filling portion 92 in the first space 100 and the placement of the second space filling portion 94 in the second space 101 by simply inserting the inserting portion 90 through the communicating hole 108. Thus, the need to place the space filling member in each of the first space 100 and the second space 101, one for each, can be eliminated, thus providing an improved working efficiency. Also, since only a single space filling member is required for filling both spaces 100, 101, cost reduction can also be achieved.

Figure 13:
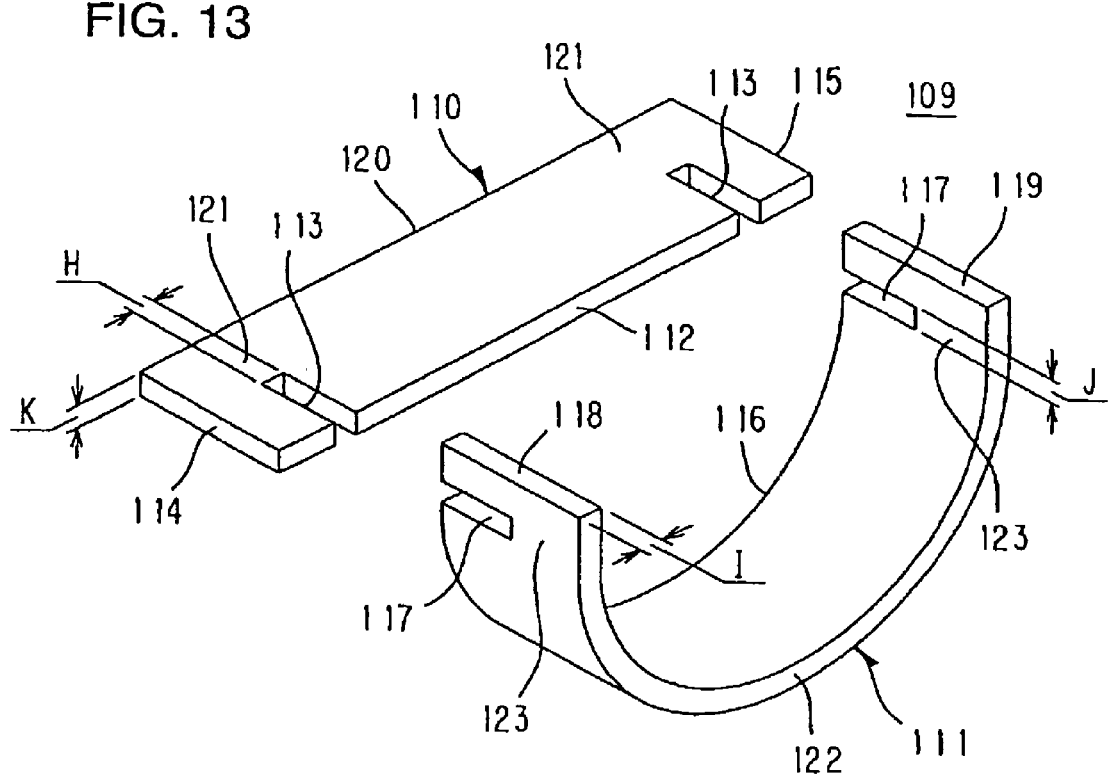
FIG. 13 is a plane view showing a yet another embodiment (combination of two or more foam base materials) of the foam filling member of the present invention.

FIG. 13 is a plane view showing a yet another embodiment of the foam filling member of the present invention.

Figure 14:
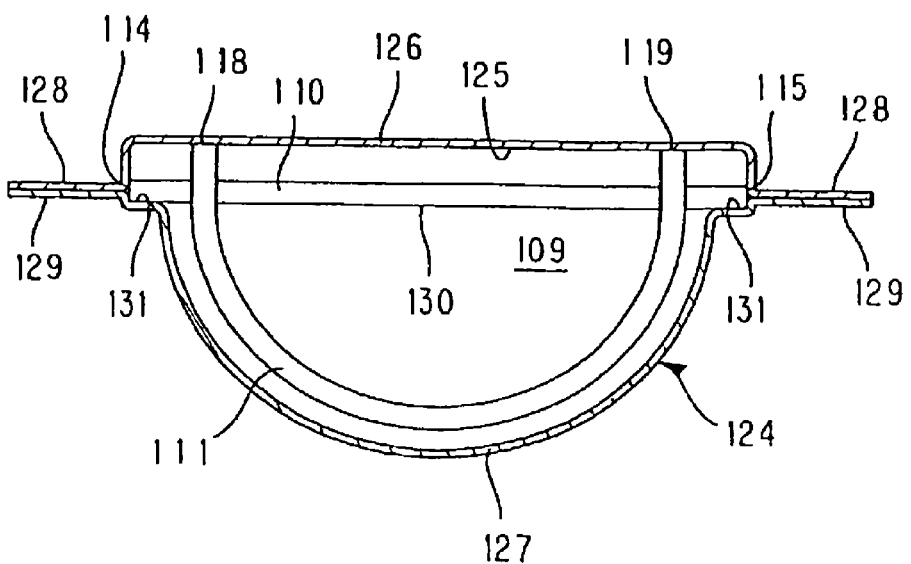
FIG. 14 is a sectional view showing the state of the foam filling member of FIG. 13 being formed in three dimension and placed in the interior space of the pillar.

In FIG. 13, this foam filling member 109, which is used for filling foam in an interior space 125 of a vehicle pillar 124, as mentioned later, comprises a first foaming base material 110 and a second foaming base material 111 which are of foamable material in sheet form and separate from each other (Cf. FIG. 14).

The first foaming base material 110 and the second foaming base material 111 are formed of foaming material which is foamed by heating (e.g. at about 120° C. to about 210° C.), as is the case in the above. The both foaming base materials 110, 111 are formed in a rectangular shape, as viewed from top.

The first foaming base material 110 has cutouts 113, formed at certain lengthwise locations in a surface 112 on one long side thereof or in one widthwise side surface thereof, to extend through in the thickness direction and allow insertion of the second foaming base material 111. The cutouts 113 are formed in the one long side surface 112 of the first foaming base material 110 at a lengthwise location near one short side surface 114 which is a side surface on one lengthwise side of the surface 112 and at a lengthwise location near the other short side surface 115 which is a side surface on the other lengthwise side of the surface 112, respectively, so that they are spaced apart from each other at a predetermined interval in the longitudinal direction of the first foaming base material 110. The cutouts 113 are cut out in concave form from the one long side surface 112 toward the other long side surface 120 which is a side surface on the other widthwise side of the first foaming base material 110. The cutouts 113 are formed in a generally rectangular form, as viewed from top, with their lengthwise directions corresponding to the widthwise direction of the first foaming base material 110.

Each of the cutouts 113 is formed to have a width H, extending in a direction orthogonal to the longitudinal direction, which is slightly smaller than a thickness I of the second foaming base material 111 inserted. This can allow the second foaming base material 111 inserted to be held in sandwich relation between both side surfaces of the each cutout 113.

The second foaming base material 111 has cutouts 117, formed at certain lengthwise locations in a surface 116 on one long side thereof or in one widthwise side surface thereof, to extend through in the thickness direction and allow insertion of the first foaming base material 110. The cutouts 117 are formed in one long side surface 116 of the second foaming base material 111 at a lengthwise location near one short side surface 118 which is a side surface on one lengthwise side of the surface 116 and at a lengthwise location near the other short side surface 119 which is a side surface on the other lengthwise side of the surface 116, respectively, so that they are spaced apart from each other at a predetermined interval in the longitudinal direction of the second foaming base material 111. The cutouts 117 are cut out in concave form from the one long side surface 116 toward the other long side surface 122 which is a side surface on the other widthwise side of the second foaming base material 111. The cutouts 117 are formed in a generally rectangular form, as viewed from top, with their lengthwise directions corresponding to the widthwise direction of the second foaming base material 111. Each of the cutouts 117 is formed to have a width J, extending in a direction orthogonal to the longitudinal direction, which is slightly smaller than a thickness K of the first foaming base material 110 inserted. This can allow the first foaming base material 110 inserted to be held in sandwich relation between both side surfaces of the each cutout 117.

The first foaming base material 110 and the second foaming base material 111 are formed so that the second foaming base material 111 has a larger longitudinal dimension than the first foaming base material 110 and the spaced interval between the two cutouts 117 of the second foaming base material 111 is larger than the spaced interval between the two cutouts 113 of the first foaming base material 110. This configuration can allow the second foaming base materials 111 to be combined with the first foaming base material 110 by curving the second foaming base material 111 at its lengthwise center portion to be formed into a U-shape as viewed from side elevation, as shown in FIG. 13.

Specifically, the first foaming base material 110 and the second foaming base material 111 are orthogonally oriented so that an opening of the cutouts 113 of the first foaming base material 110 and an opening of the cutouts 117 of the second foaming base material 111 can confront each other. Then, coupling portions 121 of the first foaming base material 110 extending between the cutouts 113 of the first foaming base material 110 and the other long side surface 120 thereof are put in engagement in the cutouts 117 of the second foaming base material 111 and also coupling portions 123 of the second foaming base material 111 extending between the cutouts 117 of the second foaming base material 111 and the other long side surface 122 thereof are put in engagement in the cutouts 113 of the first foaming base material 110.

The both foaming base materials 110, 111 are integrally combined with each other in this manner. The coupling portions 123 of the second foaming base material 111 inserted are sandwiched between the both side surfaces of the cutouts 113 and also the coupling portions 121 of the first foaming base material 110 inserted are sandwiched between the both side surfaces of the cutouts 117, whereby the both foaming base materials 110, 111 are fixed to each other. This produces the foam filling member 109 of the three-dimensional configuration shown in FIG. 14.

The foam filling member 109 thus produced is placed in a space between structures or in an interior space of a hollow structure and then is heated to a foaming temperature. Then, the foam filling member 109 is foamed and thereby the space is filled up, without leaving any space therein. Therefore, this foam filling member 109 can be used as foam filling members of a variety of industrial products.

Next, a method of filling up the interior space of the pillar of the vehicle will be explained, taking an example of use of this foam filling member 109.

In this method, the foam filling member 109 formed to correspond in shape and size to a three-dimensional configuration of the interior space 125 of the pillar 124 to be filled is set in the pillar 124, first, as shown in FIG. 14.

The pillar 124 comprises an inner panel 126 and an outer panel 127. The inner panel 126 has a generally concave shape of cross section having an opening at one side thereof and has a flange 128, formed at both ends thereof, to extend along an opening width of the opening. The outer panel 127 has a generally half-round shape of cross section having an opening at one side thereof and has a flange 129, formed at both ends thereof, to extend along an opening width of the opening. The pillar 124 is formed so that the inner panel 126 and the outer panel 127 are welded together with their flanges 128 and 129 abutted with each other and thereby the interior space 125 is defined as the closed section between the inner panel 126 and the outer panel 127.

When the foam filling member 109 is placed in the interior of the pillar 124, the inner panel 126 and the outer panel 127 of the pillar 124 are in the state of being separated from each other. In this state, the second foaming base material 111 of the foam filling member 109 as curved is inserted in the outer panel 127. Then, the inner panel 126 is laid over the outer panel 127 to cover the first foaming base material 110. Thereafter, the inner panel 126 and the outer panel 127 are welded together with their flanges 128 and 129 abutted with each other. The foam filling member 109 is placed in the interior of the pillar 124 in this manner.

In the pillar 124 thus assembled, the one short side surface 114 and the other short side surface 115 of the first foaming base material 110 and both lengthwise end portions of the surface 130 on one side of the first foaming base material 110 are in contact with receiving surfaces 131 of the outer panel 127 formed near the openings, respectively, and the one short side surface 118 and the other short side surface 119 of the second foaming base material 111 are in contact with an inside surface of the inner panel 126, whereby the foam filling member 109 is fixed in the interior of the pillar 124. This pillar 124 is used specifically as the front pillar, the side pillar, or the rear pillar of the vehicle body.

Then, after the pillar 124 is subjected to required treatments, such as the rust-proof treatment, the first foaming base material 110 and the second foaming base material 111 of the foam filling member 109 are foamed and cured by heating in the subsequent process such as, for example, the drying line process at the baking finish, to thereby produce the foam, whereby the interior space 125 of the pillar 124 is filled up with the foam, leaving no space therein. It is preferable that the foam obtained has substantially the same density and foam ratio as those of the above.

In the foam filling member 109, the foam filling member 109 can be formed in a predetermined shape corresponding to the interior space 125 of the pillar 124 by combining the first foaming base material 110 and the second foaming base material 111 with improved working efficiency by using a simple structure of simply inserting the second foaming base material 111 in the cutouts 113 of the first foaming base material 110 in sheet form and inserting the first foaming base material 110 in the cutouts 117 of the second foaming base material 111. This can eliminate the need of the mold having a cavity corresponding to the shape of the interior space 125 of the pillar 124, and as such can allow cost reduction.

Also, this can allow the foam filling member 109 to be placed in the interior space 125 of the pillar 124 in the form corresponding to the shape of the interior space 125, without any need to be stuck on the inside walls of the first and second foaming base materials 110 and 111, thus producing an improved working efficiency. Also, since the first foaming base material 110 and the second foaming base material 111 are in the state of being not stuck on the inside walls of the interior space, the inside walls of the interior space can be subjected to the rust-proof treatment and the like even after the placement of the foam filling member 109.

In the foam filling member of the present invention, the shape, the number, and the orientation of the incisions, cuts, and cutouts, and the shape of the foam filling member subjected to these conditions may be selected in accordance with the space of the structure, without being limited to those illustrated above.

While the illustrative embodiments of the present invention are provided in the above description, such is for illustrative purpose only and it is not to be construed restrictively. Modification and variation of the present invention that will be obvious to those skilled in the art is to be covered by the following claims.

What is claimed is:

1. A foam filling member used for filling a space of a structure by foaming the structure, the foam filling member comprising:
   a first foaming base material in a form of a sheet of foamable material in which cutout portions are cut in a thickness direction thereof, and
   a second foaming base material in a form of a sheet of foamable material, having a thickness in the range of 0.5 to 6.0 mm and a flexural modulus of elasticity in the range of 20 to 150 MPa,
   wherein the foam filling member is formed in a predetermined shape such that the second foaming base material can be curved to be inserted into the cutout portions.

2. The foam filling member according to claim 1, wherein said first foaming base material is substantially rectangular in shape and having two long side surfaces, said cutout portions being disposed at distal ends of said first foaming base material, and extending partially from one long side surface of said first foaming base material to said other long side surface of said first foaming base material;
   wherein said second foaming base material is substantially U-shaped and includes cutout portions disposed at distal ends of said second foaming base material, and extending partially from one long side surface of said second foaming base material to said other long side surface of said second foaming base material; and
   wherein said cutout portions of said first foaming base material and said second foaming base material are coupled together to affix the first foaming base material to said second foaming base material.

* * * * *